United States Patent [19]

Shipman

[11] Patent Number: 4,845,823
[45] Date of Patent: Jul. 11, 1989

[54] DISC BRAKE CALIPER TOOL

[76] Inventor: Ernest E. Shipman, 2041 Sycamore Dr., Simi Valley, Calif. 93065

[21] Appl. No.: 186,235

[22] Filed: Apr. 26, 1988

[51] Int. Cl.[4] .............................................. B23P 19/04
[52] U.S. Cl. ....................................... 29/239; 81/302; 81/367; 81/424; 29/268
[58] Field of Search ......................... 29/239, 268, 238; 81/302, 352, 367, 424, 3.7

[56] References Cited

U.S. PATENT DOCUMENTS 1,109,834  9/1914  Hamchek .............................. 81/302
1,931,998 10/1933  Kattrein ............................... 81/302

Primary Examiner—Robert C. Watson
Attorney, Agent, or Firm—Leon Gilden

[57] ABSTRACT

A disc brake caliper tool is set forth wherein a plurality of generally "L" shaped offset jaws are provided with confronting surfaces to impinge on a respective individual of a pair of disc brake pads within a caliper of an automotive disc brake assembly. The offset jaws are actuated by a toggling actuation mechanism in turn actuated by a plier-type plurality of force application handles wherein an individual of said handles is provided pivotally thereto with an adapter bar pivotal from a first position adjacent and parallel to said handle to a second position parallel to but coextensive to said handle for deflecting a disc brake caliper without removal of said caliper from association with a rotor.

5 Claims, 5 Drawing Sheets

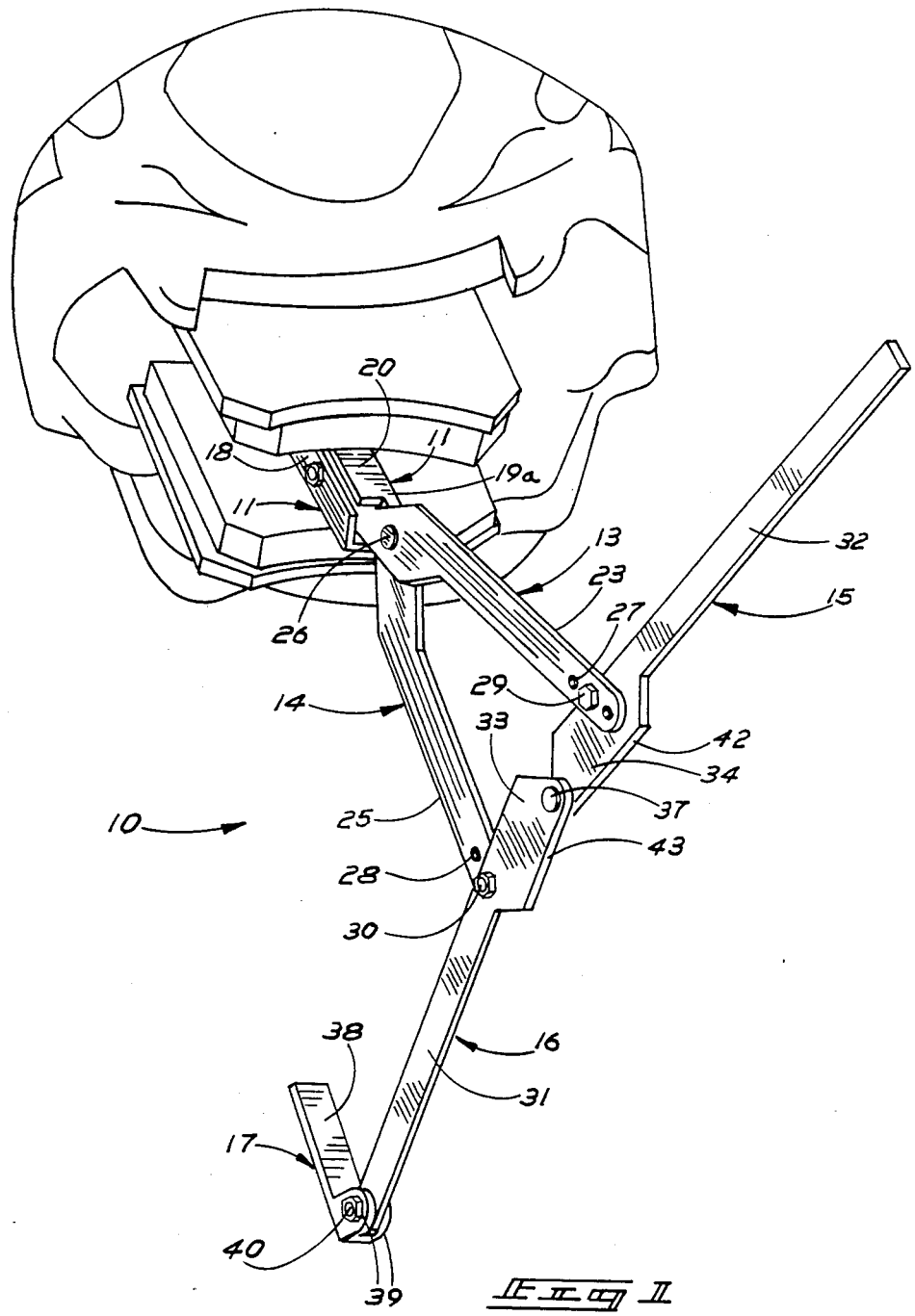

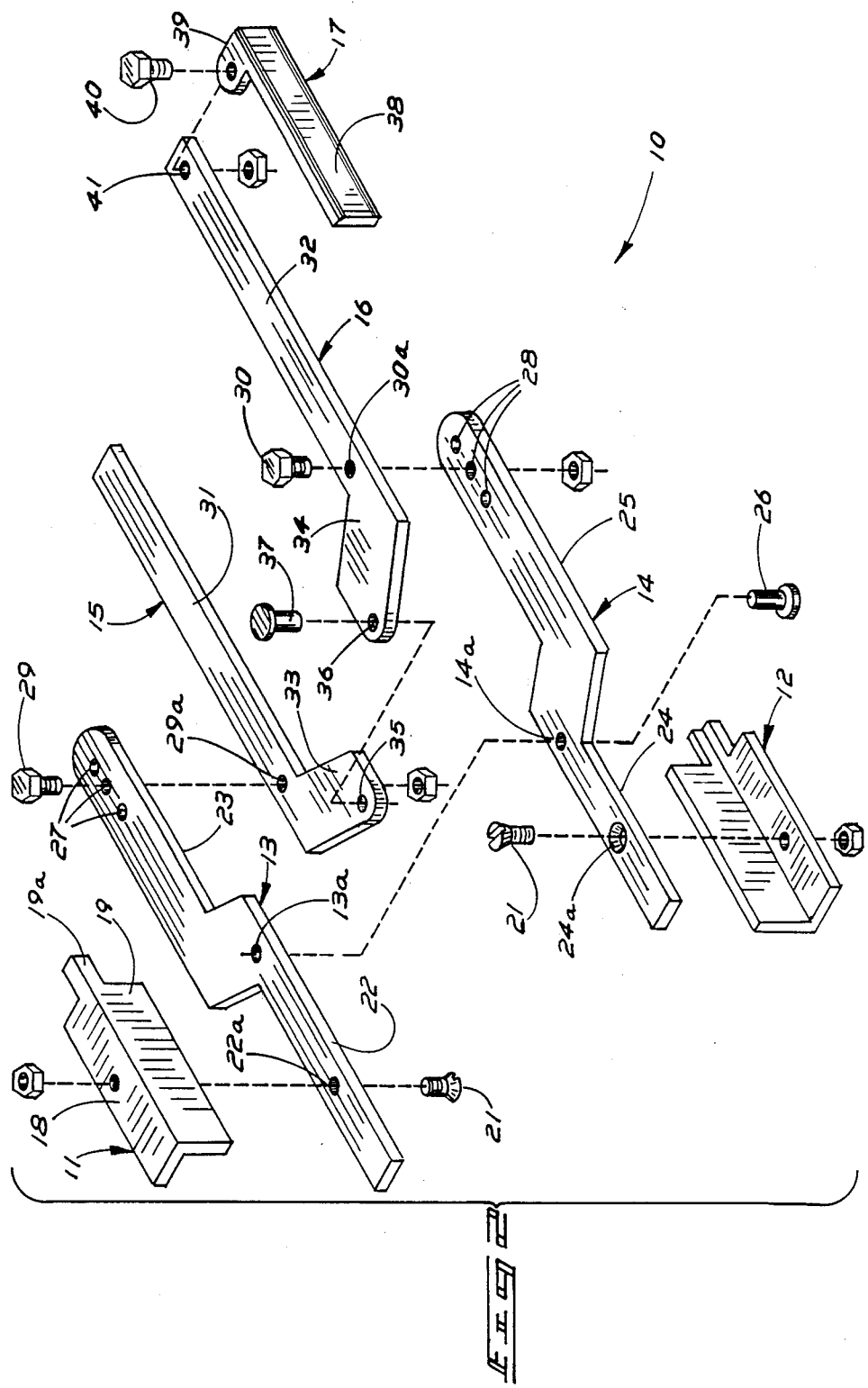

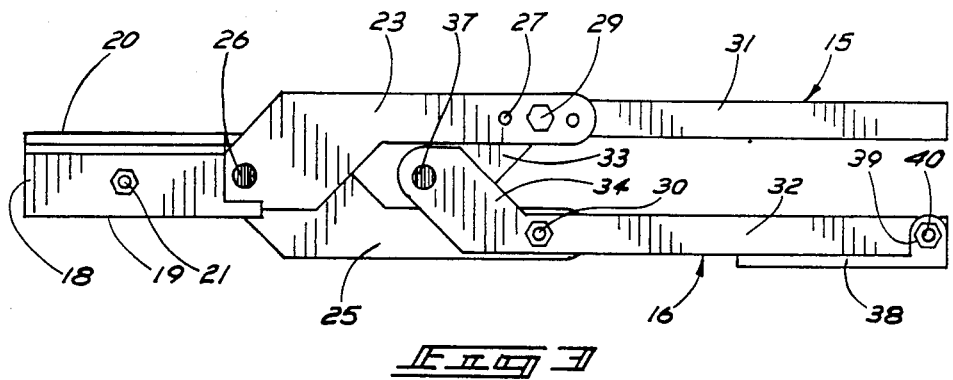
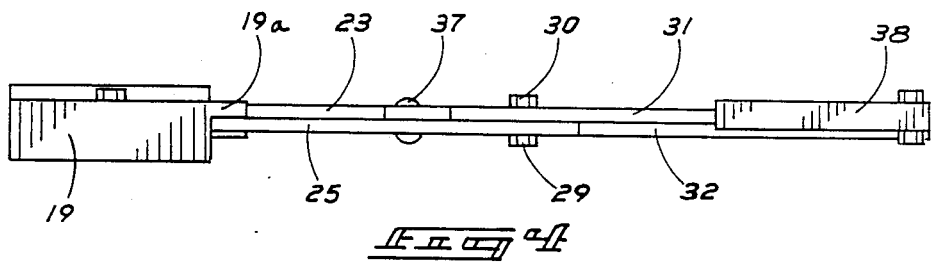
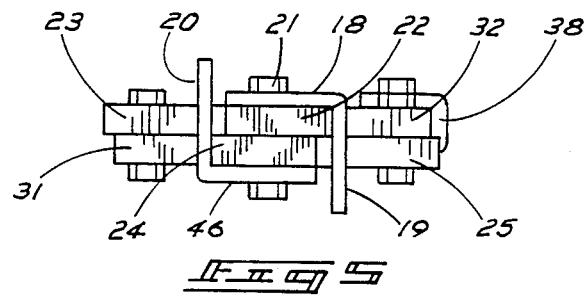
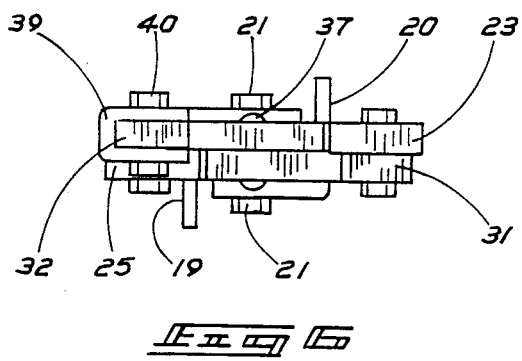

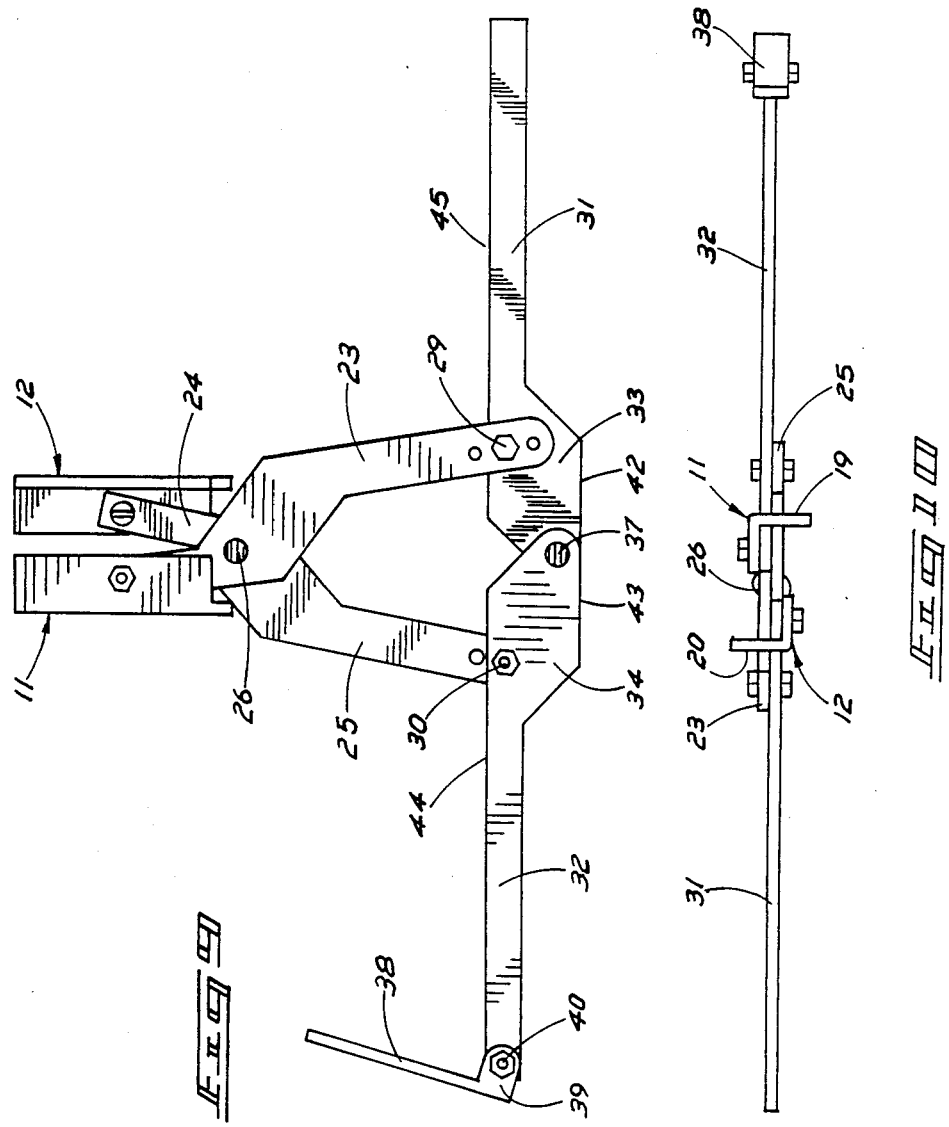

DISC BRAKE CALIPER TOOL

BACKGROUND OF THE INVENTION

1. Field of the Invention

The field of invention relates to brake tools, and more particularly pertains to a new and improved disc brake caliper tool wherein the same is provided with a multiple plurality of force application means directing offset jaws to expand and applying the offset surfaces to an offset portion of said disc brake pads to enhance retraction of an associated caliper piston.

2. Description of the Prior Art

The use of disc brake tools is well known in the prior art. The advent of disc brakes has required the development of specialized tools to adequately deal with unique problems associated with disc brake arrangements. Typically, a disc brake is provided with a rotor and an associated caliper provided with friction pads to brake the rotation of the associated rotor wherein upon replacement of such friction pads, considerable force is required to retract associated pistons impinging on said friction pads. Various tools have been presented for this purpose.

Various arrangements of brake tools have been developed for dealing with automotive brake systems and the like, such as exemplified in U.S. Design Pat. No. 183,706 to Simmons illustrating the use of a conventional brake tool for use with conventional drum brake arrangements. U.S. Design Pat. No. 190,830 to Kendis sets forth a clamping tool for an automotive chain-spreading arrangement, U.S. Design Pat. No. 273,455 to Teitelbaum sets forth an expander tool of a generally plier-type construction, U.S. Design Pat. No. 276,880 to Tozaburo sets forth another expander tool of use generally with "snap rings", U.S. Design Pat. No. 281,195 to Kurz illustrates a further plier-type expander tool and wherein the various expander tools are of particular use in specialized environments but fail to provide a plural force multiplication tool wherein a plurality of offset jaws provide for enhanced retraction of existing brake pads within a caliper for ease of replacement of said brake pads within a disc brake tool organization.

As such, it may be appreciated that there is a continuing need for a new and improved disc brake caliper tool wherein the same addresses both the problems of effectiveness and compactness of construction, and in this respect, the present invention substantially fulfills this need.

SUMMARY OF THE INVENTION

In view of the foregoing disadvantages inherent in the known types of disc brake tools now present in the prior art, the present invention provides an disc brake caliper tool wherein the same is provided with a force multiplying lever arrangement for the spreading of associated offset jaws for enhanced force application to an interior of a disc brake caliper for retraction thereof and subsequent replacement of friction pads therein. As such, the general purpose of the present invention, which will be described subsequently in greater detail, is to provide a new and improved disc brake caliper tool which has all the advantages of the prior art brake tools and none of the disadvantages.

To attain this, the present invention sets forth a plurality of "L" shaped jaws presenting opposed and parallel planar force application surfaces for positioning within an interior of a caliper of an associated disc brake organization to spread the friction pads apart retracting simultaneously an associated caliper piston and enabling replacement of the brake pads. The jaws are provided with a force multiplication toggle link arrangement that are in turn motivated by an adjustable force application plurality of plier-like handles and wherein one of said handles is provided with a pivotal adapter pry bar that is pivotal from a first position contiguous to and parallel to one of said handles to a second position coextensive with and parallel to one of said handles for insertion between a friction pad and a disc brake corroder when said caliper is secured proximate said rotor for replacement of disc brake pads without removal of the caliper.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constuctions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved disc brake caliper tool which has all the advantages of the prior art brake tools and none of the disadvantages.

It is another object of the present invention to provide a new and improved disc brake caliper tool which may be easily and efficiently manufactured and marketed.

It is a further object of the present invention to provide a new and improved disc brake caliper tool which is of a durable and reliable construction.

An even further object of the present invention is to provide a new and improved disc brake caliper tool which is susceptible of a low cost of manufacture with regard to both materials and labor, and which accordingly is then susceptible of low prices of sale to the consuming public, thereby making such disc brake caliper tools economically available to the buying public.

Still yet another object of the present invention is to provide a new and improved disc brake caliper tool which provides in the apparatuses and methods of the prior art some of the advantages thereof, while simultaneously overcoming some of the disadvantages normally associated therewith.

Still another object of the present invention is to provide a new and improved disc brake caliper tool wherein the same is provided with a plurality of force multiple higher link arrangements to present a multiple force application to a plurality of "L" shaped offset jaws for enhanced force application to disc brake friction pads of an associated disc brake caliper organization.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention in use.

FIG. 2 is an isometric exploded view of the instant invention illustrating the various parts, their configuration, and relationship.

FIG. 3 is an orthographic side view taken in elevation of the instant invention.

FIG. 4 is a top orthographic view of the instant invention.

FIG. 5 is a front orthographic view of the instant invention illustrating the relationship of the jaws.

FIG. 6 is a rear orthographic view of the instant invention.

FIG. 9 is an orthographic side view of the instant invention taken in elevation illustrating the tool in a fully expanded orientation.

FIG. 10 is an orthographic front view of the instant invention, as illustrated in FIG. 9.

DESCRIPTION OF THE PREFERRED EMBODIMENT

Figure 7:
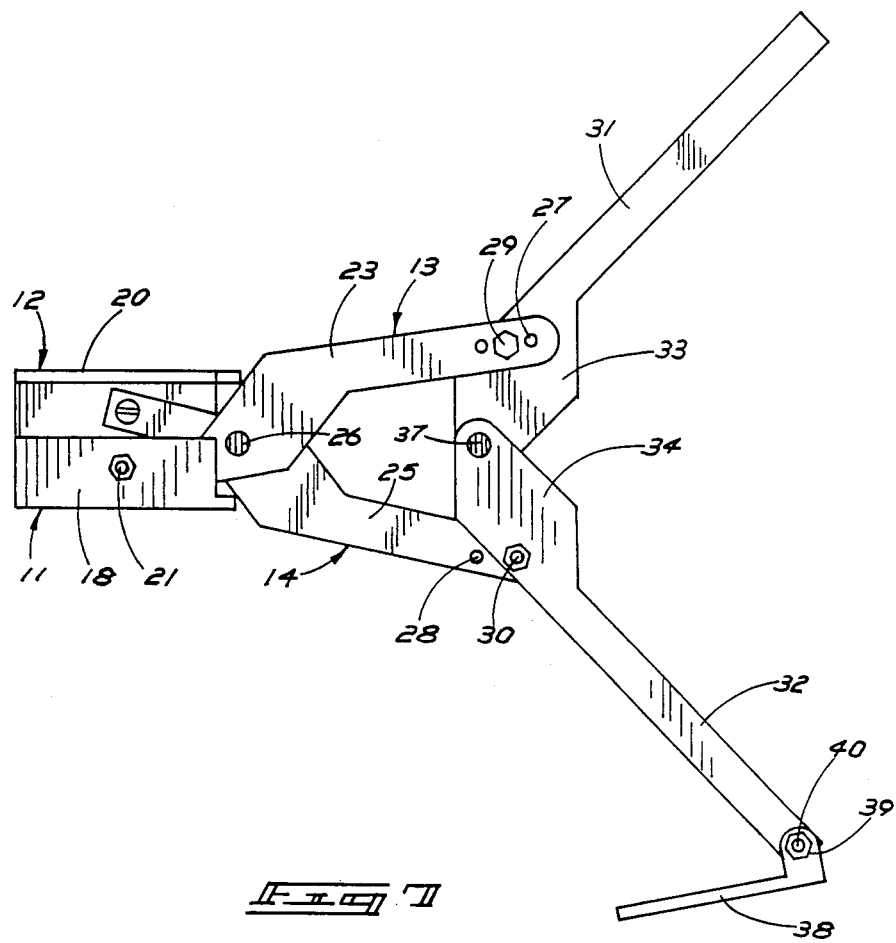
FIG. 7 is an orthographic side view of the instant invention illustrating the tool in a partially expanded orientation.
Figure 8:
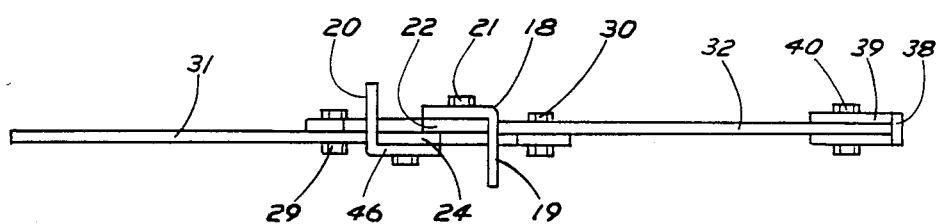
FIG. 8 is a frontal orthographic view of the instant invention, as illustrated in FIG. 7.

With reference now to the drawings, and in particular to FIGS. 1 to 9 thereof, a new and improved disc brake caliper tool embodying the principles and concepts of the present invention and generally designated by the reference numeral 10 will be described.

More specifically, the disc brake caliper tool 10, with reference to FIG. 1, is utilized in conjunction with a conventional caliper of a disc brake assembly for applying opposed spreading forces to the associated brake pads to enable the replacement of brake pads. As new brake pads are of a greater thickness than the worn brake pads, the worn pads must be spread and thereby compressed in an associated piston (not shown) to enable repositioning of the caliper overlying an existing rotor, not shown, of conventional and well known construction. The disc brake caliper tool 10 essentially comprises a first jaw 11 cooperative with a second jaw 12 actuated by a first link 13 secured to first jaw 11 wherein said first link 13 is pivotally communicating with a second link 14 which in turn is secured to the second jaw 12. Each of said first and second links 13 and 14 respectively are of a generally "S" shaped configuration forming a toggle link organization relative to one another. First handle 15 is pivotally secured to first link 13 and is itself pivotally associated with a second handle 16 that is pivotally communicating with the second link 14. An adapter plate 17 is in turn pivotally secured to a distal end of second handle 16.

First jaw 11 is formed with a first securement surface 18 whereby a threaded fastener 21 of conventional construction secures the aforenoted surface 18 to a first forward leg 22 by means of a second opening 22a. Orthogonally and integrally secured to the first securement face 18 is a first pressure face 19 formed with a first extension surface 19a rearwardly thereof of a reduced width to that of first pressure face 19 to provide an extension of the pressure face 19 whereby upon insertion of the jaws 11 and 12 between a plurality of disc pads, as illustrated in FIG. 1, the surface 19a and a second extension surface 20a formed to second pressure face 20 of the second jaw 12 enables the tool to be inserted at a maximum length within the caliper and prevent rocking of the pressure faces 19 and 20 and accordingly enables application of force over a maximum surface. The second jaw 12 is of similar construction, as illustrated in FIGS. 2, 5, and 6 for example, with the aforenoted second pressure face 20 parallel and spaced from first pressure space 19 and formed with a second securement face 46 securable to the second forward link 24 of second link 14 through a second aperture 24a by a conventional fastener 21.

The first and second links 13 and 14 respectively are of mirror image construction wherein first link 13 has formed thereto the aforenoted first forward leg 22 and a rearwardly extending first rearward leg 23 formed with a plurality of openings 27 wherein a like plurality of openings 28 are formed onto a second rearward leg 25 of the second link 14 wherein the respective openings 27 and 28 enable respective varying of mechanical advantage imposed to the first link 13 and second link 14 and ultimately to the first jaw 11 and second jaw 12 by the repositioning of the respective first handle 15 and the second handle 16 with respect to the aforenoted first and second links 13 and 14. The first and second links 13 and 14 are secured to the first and second handles 15 and 16 by use of respective first and second connectors 29 and 30 oriented through an aligned opening 27 with a cooperative handle opening 29a and similarly, a second connector 30 is aligned through a handle opening 30a through one of the second openings 28 in second link 14.

First and second handles 15 and 16 respectively are formed with a first elongate handle 31 secured to a first inwardly directed lever 33 with second handle 16 formed with a second elongate handle 32 integrally formed to a second inwardly directed lever 34. Similarly, the handles 15 and 16 are oriented in a mirror image relationship to one another and are pivotally secured to one another by the second pivot pin 37. It may be noted that the first pivot pin 26 secures the first and second links 13 and 14 together, as illustrated throughout the drawings.

Pivotally secured to a rear distal end of second handle 16 is the adapter plate 17 formed as a plate 38 with an inwardly joined bifurcated pivot joint 39 formed with an opening therethrough to communicate with the joint connector 40 secured through the joint aperture 41 and the aperture formed to the bifurcated pivot joint 39 orthogonally to the downwardly depending ears of the joint 39.

With attention to FIGS. 7 and 9, the progressive opening of the disc brake caliper tool is apparent wherein a fully open position, as illustrated in FIG. 9, the caliper tool 10 is in a locked configuration as first lever edge 42 is aligned with second lever edge 43 and the exterior second handle edge 44 is aligned with the exterior first handle edge 45 wherein the second pivot pin 37 is at an overcenter relationship relative to the respective first and second connectors 29 and 30 and thereby maintains the tool at a locked configuration with the first and second jaws 11 and 12 in opened or spread configuration.

The spreader plate 38 is utilized in disc brake organizations where the caliper need not be removed relative to an associated rotor wherein the spreader plate 38 is opened from a first position, as illustrated in FIG. 3 for example, that is adjacent to and parallel to second elongate handle 32 to a second configuration that is coextensive with and in alignment with the second handle 32 to enable a user to insert the spreader plate 38 between an associated rotor and a disc brake pad and accordingly by twisting the caliper tool 10, the spreader plate 38 will force an associated caliper piston into a retracted position to enable removal of the old pads and insertion of new ones therefore.

As to the manner of usage and operation of the present invention, the same should be apparent from the above description. Accordingly, no further discussion relative to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A disc brake caliper tool comprising a first jaw means including a first planar pressure face movably spaced relative to a second jaw means including a second planar pressure face, and said first and second jaw means are movable from a first closely spaced position to a second distally spaced position wherein said first and second planar pressure surface are maintained generally parallel to each other, and first jaw means secured to a first end of a first link, and said second jaw means pivotally secured to a first end of a second link, and said links of generally "S" shaped configuration and pivotally joined together between their respective first ends, and first and handle means pivotally joined together at first ends of said handle means are pivotally joined to respective first and second links between said first ends of said first and second handle means and other ends of said first and second handle means wherein said first and second handle means are movable from a handle position to correspond to said first position of said first and second jaw means to a second handle position corresponding to said second position of said first and second jaw means wherein said first and second handle means are generally parallel to each other in said first handle position and aligned with each other in the second handle position to lock said disc brake caliper tool in said second handle position, and a spreader plate formed with an integrally secured bifurcated end pivotally secured to the other end of said second handle means wherein said spreader plate is pivotal from a first spreader plate position adjacent to and parallel to said second handle means to a second spreader plate position coextensive with said second handle means.

2. A disc brake caliper tool as set forth in claim 1 wherein each of said first and second planar pressure faces of said respective first and second jaw means include an extension surface extending rearwardly of each of said first and second planar pressure faces of reduced width than that of said first and second planar faces.

3. A disc brake caliper tool as set forth in claim 2 wherein said first and second handle means are each formed with an elongate handle and an inwardly directed lever wherein said first and second handle means are pivotally secured together proximate remote portions of said inwardly directed lever and said inwardly directed lever of said first and second handle means are inwardly formed to respective first and second elongate handle portions at obtuse angles.

4. A disc brake caliper tool as set forth in claim 3 wherein said first and second handle means are selectively securable to respective first and second links through one of a series of openings positioned within said respective first and second links to enable variance of mechanical advantage imposed as a first and second links by the respective first and second handle means.

5. A disc brake caliper tool as set forth in claim 4 wherein each of said first and second jaw means includes a respective first and second extension surface orthogonally and integrally formed to each of said respective first and second planar pressure faces wherein each of said respective extension surfaces are pivotally secured to said respective first and second links.

* * * * *